US012665340B2

(12) United States Patent
Hamai et al.

(10) Patent No.: US 12,665,340 B2
(45) Date of Patent: Jun. 23, 2026

(54) CONNECTOR AND WIRE HARNESS

(71) Applicant: YAZAKI CORPORATION, Tokyo (JP)

(72) Inventors: Tsuyoshi Hamai, Makinohara (JP); Takatoshi Suzuki, Makinohara (JP); Masakazu Nagaoka, Makinohara (JP); Takuya Ohashi, Kakegawa (JP)

(73) Assignee: YAZAKI CORPORATION, Tokyo (JP)

( * ) Notice: Subject to any disclaimer, the term of this patent is extended or adjusted under 35 U.S.C. 154(b) by 351 days.

(21) Appl. No.: 18/599,213

(22) Filed: Mar. 8, 2024

(65) Prior Publication Data

US 2024/0213703 A1 Jun. 27, 2024

Related U.S. Application Data

(63) Continuation of application No. PCT/JP2022/044679, filed on Dec. 5, 2022.

(30) Foreign Application Priority Data

Dec. 28, 2021 (JP) ................................ 2021-214459

(51) Int. Cl.
*H01R 13/436* (2006.01)
*H01R 4/18* (2006.01)
(Continued)

(52) U.S. Cl.
CPC ........... *H01R 13/436* (2013.01); *H01R 4/185* (2013.01); *H01R 11/12* (2013.01); *H01R 13/5216* (2013.01)

(58) Field of Classification Search
None
See application file for complete search history.

(56) References Cited

U.S. PATENT DOCUMENTS 10,270,187 B2 * 4/2019 Morita ..................... H01R 4/34
2015/0147918 A1 * 5/2015 Matsuda ................. B60L 50/50 439/694
(Continued)

FOREIGN PATENT DOCUMENTS

CN 110311248 A * 10/2019 ............. H01R 13/58
JP 2013-26127 A 2/2013
(Continued)

OTHER PUBLICATIONS

International Search Report for PCT/JP2022/044679 dated Jan. 31, 2023.

*Primary Examiner* — Tho D Ta
(74) *Attorney, Agent, or Firm* — KENEALY VAIDYA LLP

(57) ABSTRACT

A housing is provided which accommodates a plurality of terminal-equipped electric wires side by side in an arrangement direction, in which a first terminal fitting causes a first coupling portion to protrude from a first electric wire connection portion to a side opposite to a drawing direction of an electric wire and causes a first terminal connection portion to protrude from the first coupling portion in a protruding direction, a second terminal fitting causes a second coupling portion to protrude from a second electric wire connection portion to a side of the drawing direction of the electric wire and causes a second terminal connection portion to protrude from the second coupling portion in the protruding direction, the second terminal connection portion is disposed at a position overlapping a coating of the electric wire drawn out from the second electric wire connection portion.

8 Claims, 9 Drawing Sheets

(51) Int. Cl.

| | |
|---|---|
| ***H01R 11/12*** | (2006.01) |
| ***H01R 13/52*** | (2006.01) |

(56) References Cited

U.S. PATENT DOCUMENTS

| | | | | |
|---|---|---|---|---|
| 2018/0309231 | A1 | 10/2018 | Sakaguchi | |
| 2020/0381861 | A1* | 12/2020 | Tanaka | H01R 13/506 |

FOREIGN PATENT DOCUMENTS

| | | | | | |
|---|---|---|---|---|---|
| JP | 2013-171649 | A | | 9/2013 | |
| JP | 2017-62922 | A | | 3/2017 | |
| JP | 2019-75203 | A | | 5/2019 | |
| JP | 2021-136137 | A | | 9/2021 | |
| WO | WO-2015063926 | A1 | * | 5/2015 | H01R 43/005 |

* cited by examiner

CONNECTOR AND WIRE HARNESS

CROSS-REFERENCE TO RELATED APPLICATION

This application is a continuation application of International Application No. PCT/JP2022/044679 filed on Dec. 5, 2022 which claims the benefit of priority from Japanese Patent Application No. 2021-214459 filed on Dec. 28, 2021 and designating the U.S., the entire contents of which are incorporated herein by reference.

BACKGROUND OF THE INVENTION

1. Field of the Invention

The present invention relates to a connector.

2. Description of the Related Art

Conventionally, as a connector, a connector has been known in which a plurality of sets of terminal-equipped electric wires are arranged side by side in a direction orthogonal to an axial direction of each electric wire in a housing, and are fitted and connected to a counterpart connector in a direction orthogonal to the axial direction and the orthogonal direction. A terminal fitting used in the connector includes a terminal connection portion that is physically and electrically connected to a counterpart connector and an electric wire connection portion that is physically and electrically connected to a terminal of an electric wire, and an extending direction of the terminal connection portion along a fitting connection direction to the counterpart connector and a drawing direction of the electric wire from the electric wire connection portion are orthogonal to each other. For example, Japanese Patent Application Laid-open No. 2017-62922 and Japanese Patent Application Laid-open No. 2019-75203 below disclose this type of connector. In the connector of Japanese Patent Application Laid-open No. 2017-62922, a terminal connection portion protrudes from a position of an electric wire connection portion in a fitting connection direction to a counterpart connector, thereby reducing a size of the terminal fitting in a drawing direction (axial direction) of the electric wire. In addition, in the connector of Japanese Patent Application Laid-open No. 2019-75203, a terminal connection portion and an electric wire connection portion are connected by an elastic member formed of a braided wire, thereby reducing the size of a terminal fitting in a wire drawing direction (axial direction). With use of such a terminal fitting, the connectors of Japanese Patent Application Laid-open No. 2017-62922 and Japanese Patent Application Laid-open No. 2019-75203 aim to reduce an overall size in the drawing direction (axial direction) of the electric wire.

By the way, in the connector, in a containment chamber of the housing, the respective electric wires of the plurality of sets of terminal-equipped electric wires are arranged in a direction orthogonal to the axial direction of the electric wires, and the respective terminal fittings of the two adjacent terminal-equipped electric wires are offset from each other in the axial direction of the electric wires in this arrangement state, whereby the respective terminal connection portions may be arranged to be shifted from each other in the axial direction of the electric wires. In such a connector, since the electric wire connection portion is also arranged to be shifted in the axial direction of the electric wire in the containment chamber together with the terminal connection portion, in order to secure a connection region between the electric wire connection portion and the electric wire, there is a need to increase the volume of the containment chamber of the housing in the drawing direction (axial direction) of the electric wire as compared with a case where two adjacent terminal fittings are not arranged to be offset. For this reason, with an increase in the size of the housing of the connector, there is a possibility that an entire size of the connector also increases in the drawing direction (axial direction) of the electric wire.

SUMMARY OF THE INVENTION

Therefore, an object of the present invention is to provide a connector capable of suppressing an increase in size.

The connector according to one aspect of the present invention includes: a terminal fitting including: an electric wire connection portion that causes an electric wire to which a core wire of a terminal is physically and electrically connected to be drawn out in an axial direction; a terminal connection portion that is a portion protruding in a direction orthogonal to the axial direction and is inserted into a counterpart connector to be physically and electrically connected to an electrical connection target of the counterpart connector; and a coupling portion that couples the electric wire connection portion and the terminal connection portion; and a housing in which a plurality of terminal-equipped electric wires including a set of the terminal fittings and the electric wires are arranged in an arrangement direction orthogonal to the axial direction and the orthogonal direction, protruding directions of the respective terminal connection portions of the plurality of terminal-equipped electric wires are aligned in the same direction, and drawing directions of the electric wires from the respective electric wire connection portions of the plurality of terminal-equipped electric wires are aligned in the same direction and accommodated in an inner containment chamber, wherein a first terminal fitting including a first electric wire connection portion, a first terminal connection portion, and a first coupling portion as the electric wire connection portion, the terminal connection portion, and the coupling portion, and a second terminal fitting including a second electric wire connection portion, a second terminal connection portion, and a second coupling portion as the electric wire connection portion, the terminal connection portion, and the coupling portion are provided as the terminal fitting, the first terminal fitting causes the first coupling portion to protrude from the first electric wire connection portion to a side opposite to the drawing direction and causes the first terminal connection portion to protrude from the first coupling portion in the protruding direction, the second terminal fitting causes the second coupling portion to protrude from the second electric wire connection portion toward the drawing direction and causes the second terminal connection portion to protrude from the second coupling portion in the protruding direction, the second terminal connection portion is disposed at a position overlapping a coating of the electric wire drawn out from the second electric wire connection portion when viewed in the protruding direction of the second terminal connection portion, and in the containment chamber, the first terminal fitting and the second terminal fitting are arranged side by side in the arrangement direction in a state where the second terminal connection portion is offset from the first terminal connection portion in the drawing direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
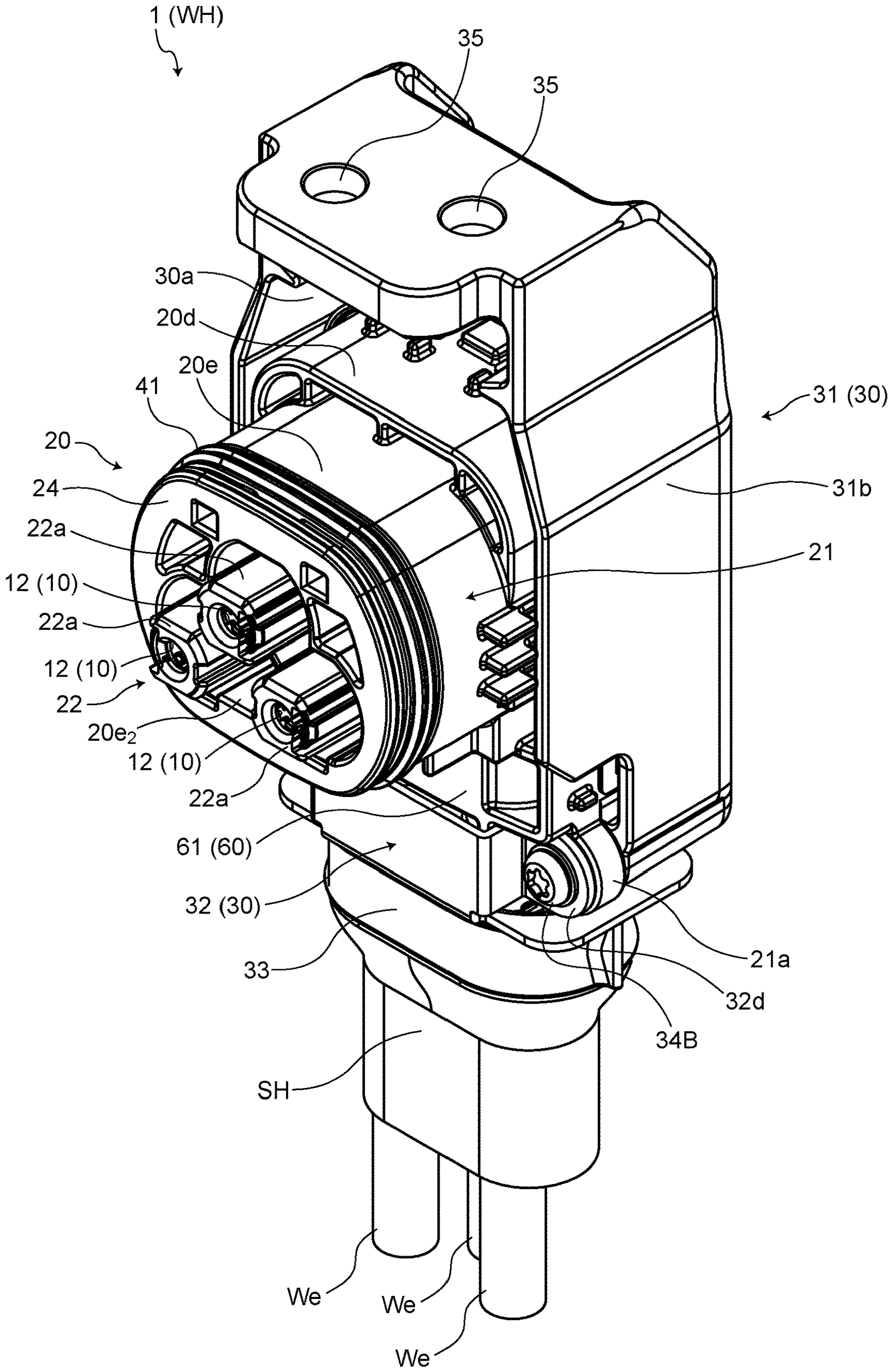
FIG. 1 is a perspective view illustrating a connector according to an embodiment.

A connector according to the present invention includes a terminal fitting and a housing, and is connected to a terminal of an electric wire.

The terminal fitting includes: an electric wire connection portion that causes an electric wire to which a core wire of a terminal is physically and electrically connected to be drawn out in an axial direction of the electric wire; a terminal connection portion that is a portion protruding in a direction orthogonal to the axial direction and is inserted into a counterpart connector to be physically and electrically connected to an electrical connection target of the counterpart connector; and a coupling portion that couples the electric wire connection portion and the terminal connection portion. Further, in the housing, a plurality of terminal-equipped electric wires including a set of terminal fittings and electric wires are arranged in an arrangement direction orthogonal to the axial direction and the orthogonal direction, protruding directions of the respective terminal connection portions of the plurality of terminal-equipped electric wires are aligned in the same direction, and drawing directions of the electric wires from the respective electric wire connection portions of the plurality of terminal-equipped electric wires are aligned in the same direction, and the plurality of terminal-equipped electric wires are housed in an inner containment chamber.

In this connector, at least two terminal-equipped electric wires are housed in the containment chamber of the housing. Therefore, the connector includes, as a terminal fitting, a first terminal fitting having a first electric wire connection portion, a first terminal connection portion, and a first coupling portion as an electric wire connection portion, a terminal connection portion, and a coupling portion, and a second terminal fitting having a second electric wire connection portion, a second terminal connection portion, and a second coupling portion as an electric wire connection portion, a terminal connection portion, and a coupling portion. The first terminal fitting is formed in a shape in which the first coupling portion protrudes from the first electric wire connection portion to a side opposite to the drawing direction of the electric wire, and the first terminal connection portion protrudes from the first coupling portion in the protruding direction. In addition, the second terminal fitting is formed in a shape in which the second coupling portion protrudes from the second electric wire connection portion toward a wire drawing direction, and the second terminal connection portion protrudes from the second coupling portion in the protruding direction. Then, the second terminal connection portion is arranged at a position overlapping a coating of the electric wire drawn out from the second electric wire connection portion as viewed in the protruding direction. In the containment chamber of the housing, the first terminal fitting and the second terminal fitting are arranged side by side in the arrangement direction in a state where the second terminal connection portion is offset from the first terminal connection portion in the drawing direction of the electric wire.

Here, in the conventional connector, since the plurality of first terminal fittings are accommodated in the containment chamber of the housing, when one first terminal connection portion of two first terminal fittings adjacent in the arrangement direction is offset in the electric wire drawing direction with respect to the other first terminal connection portion, there is a need to enlarge a capacity of the containment chamber of the housing in the electric wire drawing direction (axial direction) in order to secure a connection region between the first electric wire connection portion of one first terminal fitting and the electric wire. Therefore, in the conventional connector, as the size of the housing increases, an entire size also increases in the drawing direction (axial direction) of the electric wire.

On the other hand, in the connector according to the present invention, the arrangement of the second electric wire connection portion and the second terminal connection portion of the second terminal fitting is replaced with respect to the arrangement of the first electric wire connection portion and the first terminal connection portion of the first terminal fitting, and the second terminal connection portion is offset in the electric wire drawing direction with respect to the first terminal connection portion. That is, in the connector according to the present invention, in the containment chamber of the housing, the second electric wire connection portion of the second terminal fitting can be disposed adjacent to the first electric wire connection portion of the first terminal fitting, and the second terminal connection portion of the second terminal fitting can be disposed adjacent to the first electric wire connection portion of the first terminal fitting. Therefore, in the connector according to the present invention, there is no need to increase the volume of the containment chamber of the housing in the electric wire drawing direction (axial direction) only to secure the connection region between the second electric wire connection portion of the second terminal fitting and the electric wire, which makes it possible to suppress an increase in size of the housing in the drawing direction. Therefore, the connector according to the present invention can suppress an increase in size of the entire body in the drawing direction (axial direction) of the electric wire.

Incidentally, in the connector according to the present invention, the terminal fitting is desirably formed in a shape in which the axis of the electric wire drawn out from the electric wire connection portion and the central axis of the terminal connection portion in the protruding direction are arranged on the same plane. As a result, in this connector, the plurality of terminal-equipped electric wires can be arranged with a reduced gap therebetween in the arrangement direction, which makes it possible to suppress an increase in size of the housing in the arrangement direction. Therefore, the connector according to the present invention can also suppress an increase in the overall size in the arrangement direction by using such terminal fittings (first terminal fitting, second terminal fitting).

Further, in the connector according to the present invention, it is desirable to provide a partition wall for partitioning between the first terminal fitting and the second terminal fitting in the containment chamber of the housing. As a result, in this connector, it is possible to suppress contact between the first terminal fitting and the second terminal fitting adjacent to each other. In the connector according to the present invention, when the second coupling portion is arranged to face the electric wire in the arrangement direction, the second coupling portion is desirably arranged to face the coating of the electric wire drawn out from the second electric wire connection portion on the opposite side to the first terminal fitting side. As a result, in this connector, since the second coupling portion does not interfere with the partition wall, the second terminal fitting can be arranged close to the first terminal fitting in the arrangement direction. Therefore, the connector according to the present invention can also suppress an increase in the overall size in the arrangement direction by using such a second terminal fitting.

Hereinafter, a specific embodiment of a connector according to the present invention will be described in detail with reference to the drawings. Note that the present invention is not limited by the embodiment.

[Embodiment]

One embodiment of a connector according to the present invention will be described with reference to FIGS. 1 to 9.

Reference numeral 1 in FIGS. 1 to 4 denotes a connector according to the present embodiment. The connector 1 is assembled to a terminal of an electric wire We, and configures a wire harness WH together with the electric wire We. The wire harness WH is disposed between a plurality of electric devices (not illustrated) mounted on a vehicle, and electrically connects the electric wire We to the electric devices through the connector 1, thereby electrically connecting the plurality of electric devices through the electric wire We. Here, in order to secure a shielding function of the electric devices, the wire harness WH also has a shielding function similarly to the electric device. Therefore, in the wire harness WH, a space between the plurality of connectors 1 in the electric wire We is covered from the outside with a shield material SH (FIG. 1) such as a cylindrical braid, and the connector 1 is configured as a so-called shield connector.

Figure 3:
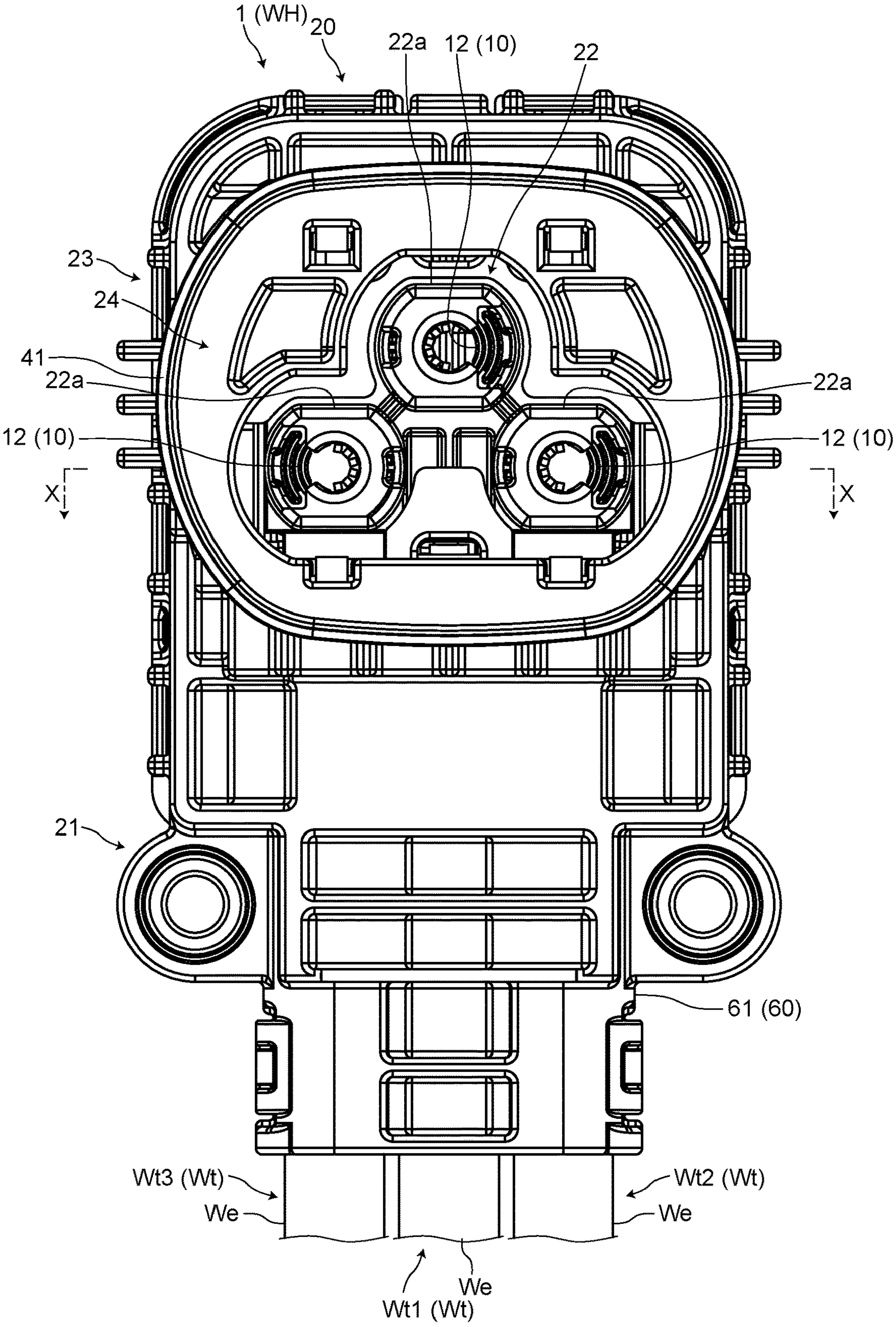
FIG. 3 is a plan view of the connector (excluding the shield shell) as viewed from a terminal connection portion side according to the embodiment.
Figure 4:
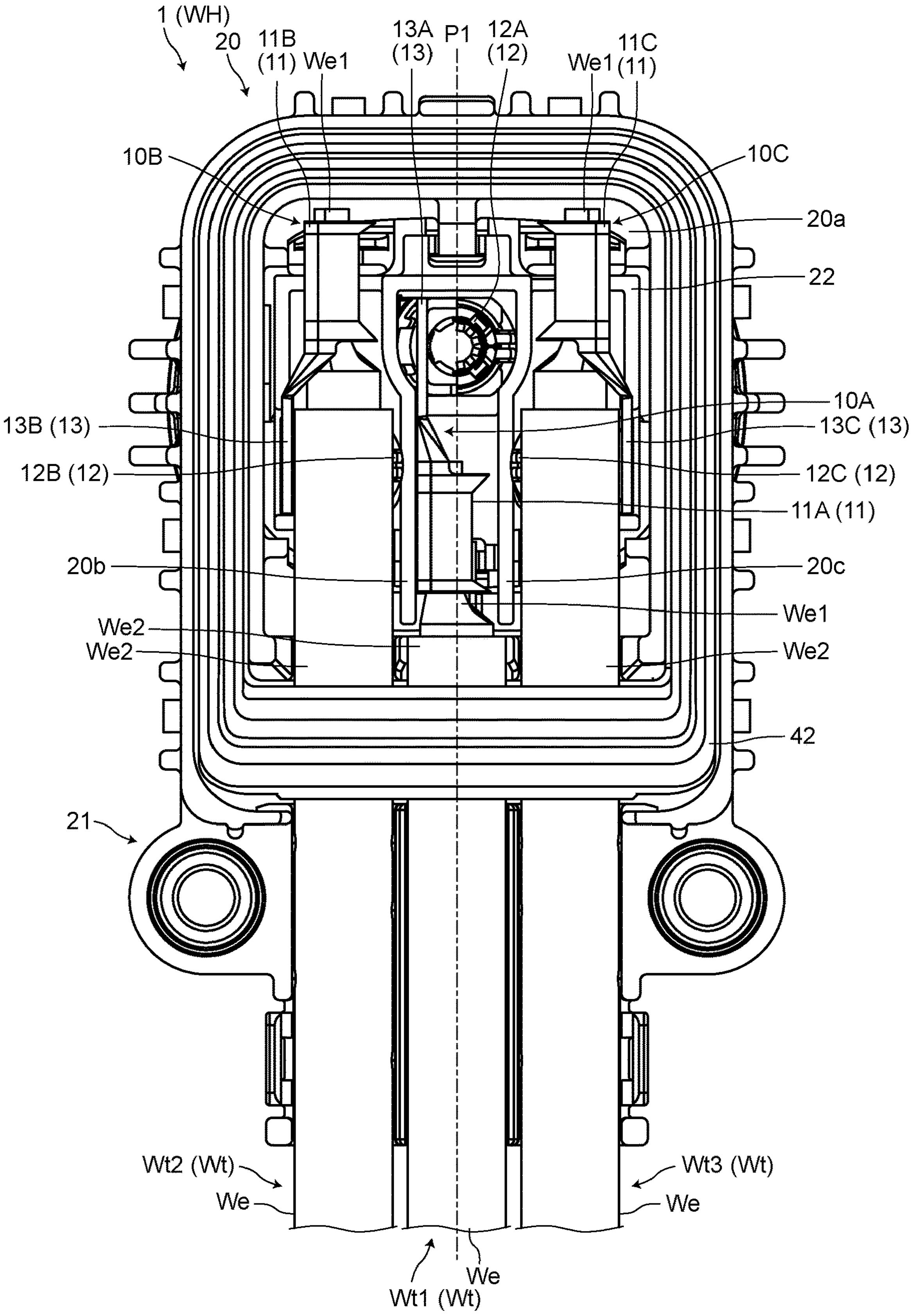
FIG. 4 is a plan view of an inside of a housing main body of the connector (excluding a shield shell and a cover member) as viewed from an insertion port side according to the embodiment.

The connector 1 includes a terminal fitting 10 and an insulating housing 20 that houses the electric wire We and the terminal fitting 10 (FIGS. 1, 3, and 4). Further, the connector 1 includes a conductive shield shell 30 for reducing noise (FIG. 1).

The terminal fitting 10 is made of a conductive material such as metal. For example, the terminal fitting 10 is formed into a predetermined shape by press molding such as bending or cutting a metal plate as a base material.

The terminal fitting 10 is physically and electrically connected to a core wire We1 of the terminal of the electric wire We to form a terminal-equipped electric wire Wt (FIGS. 4 to 8). Then, the terminal fitting 10 is electrically connected to a device body in a metal housing of the electric device (not illustrated).

The terminal fitting 10 includes an electric wire connection portion 11 that causes the electric wire We to which the core wire We1 of the terminal is physically and electrically connected to be drawn out in the axial direction of the electric wire We (FIGS. 4 to 8). The electric wire connection portion 11 is physically and electrically connected to the exposed core wire We1 of the end of the electric wire We, for example, by crimping or welding. In the electric wire connection portion 11 illustrated here, two barrel pieces are caulked and crimped to the core wire We1 placed on a bottom thereof.

In addition, the terminal fitting 10 is a portion protruding in a direction orthogonal to an axial direction of the electric wire We, and includes a terminal connection portion 12 which is inserted into a counterpart connector and is physically and electrically connected to an electrical connection target of the counterpart connector (FIGS. 1, 3, 4, and 6 to 8). For example, the terminal connection portion 12 is inserted into a housing of the electric device from a through hole (not illustrated), and is physically and electrically connected to a counterpart connector terminal fitting (not illustrated) of the electric device. Accordingly, the terminal connection portion 12 is indirectly electrically connected to the device body through the counterpart connector terminal fitting.

The terminal connection portion 12 illustrated here has a protruding direction as a fitting connection direction with respect to the counterpart connector terminal connection portion of the counterpart connector terminal fitting, and is physically and electrically connected to the counterpart connector terminal connection portion by being fitted and connected to the counterpart connector terminal connection portion along the fitting connection direction. One of the terminal connection portion 12 and the counterpart connector terminal connection portion is formed in a female terminal shape, and the other is formed in a male terminal shape. In this example, the terminal connection portion 12 is formed in a cylindrical female terminal shape, and the counterpart connector terminal connection portion is formed in a shaft-like male terminal shape to be fitted into the terminal connection portion 12. A contact member (not illustrated) that is elastically deformed as the counterpart connector terminal connection portion is inserted is assembled inside the terminal connection portion 12. Here, the counterpart connector terminal connection portion is fitted into the terminal connection portion 12, and a connection direction with respect to the counterpart connector terminal connection portion as viewed from the terminal connection portion 12 is defined as a fitting connection direction.

Figure 7:
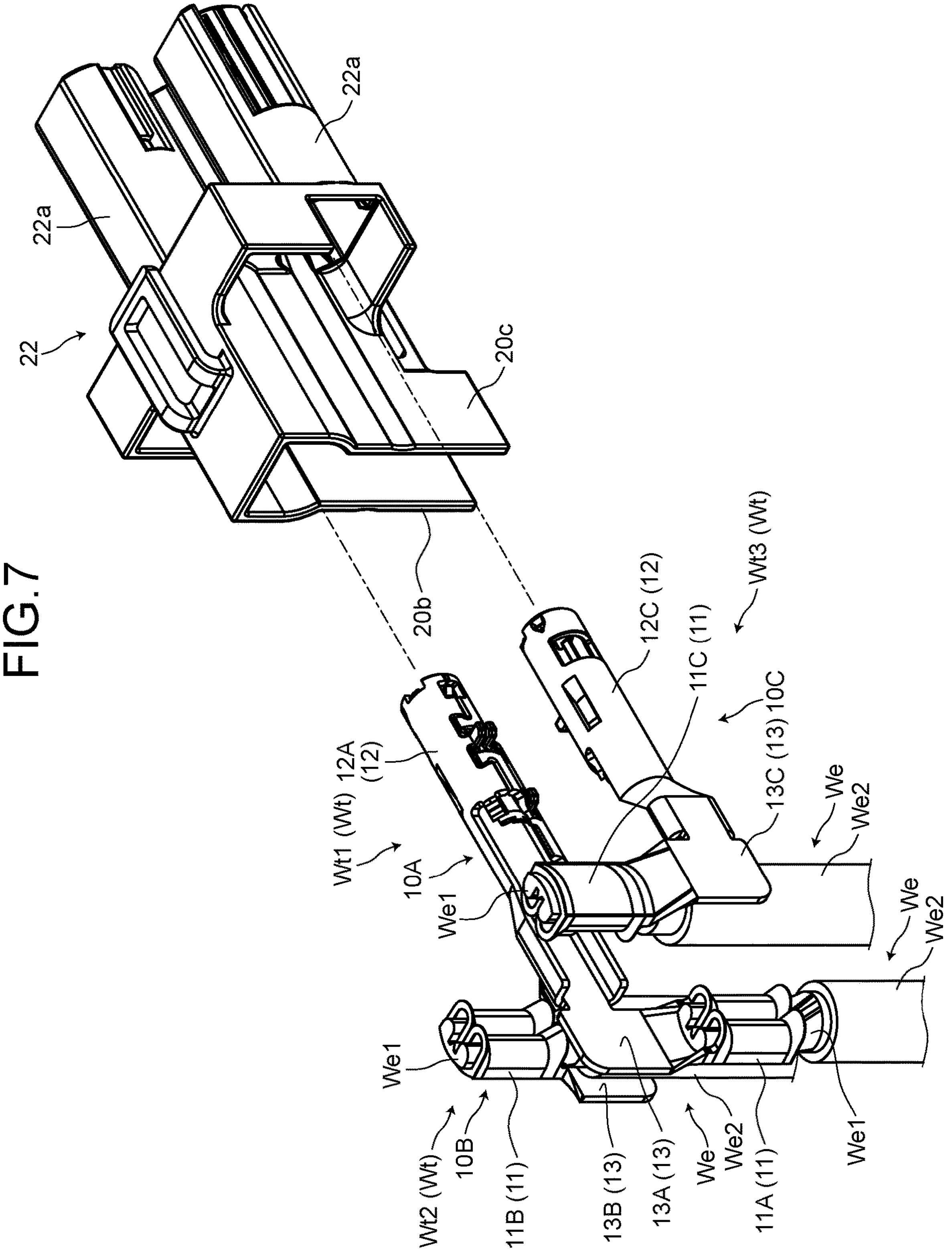
FIG. 7 is an exploded perspective view of the terminal-equipped electric wire and a terminal holding member.
Figure 8:
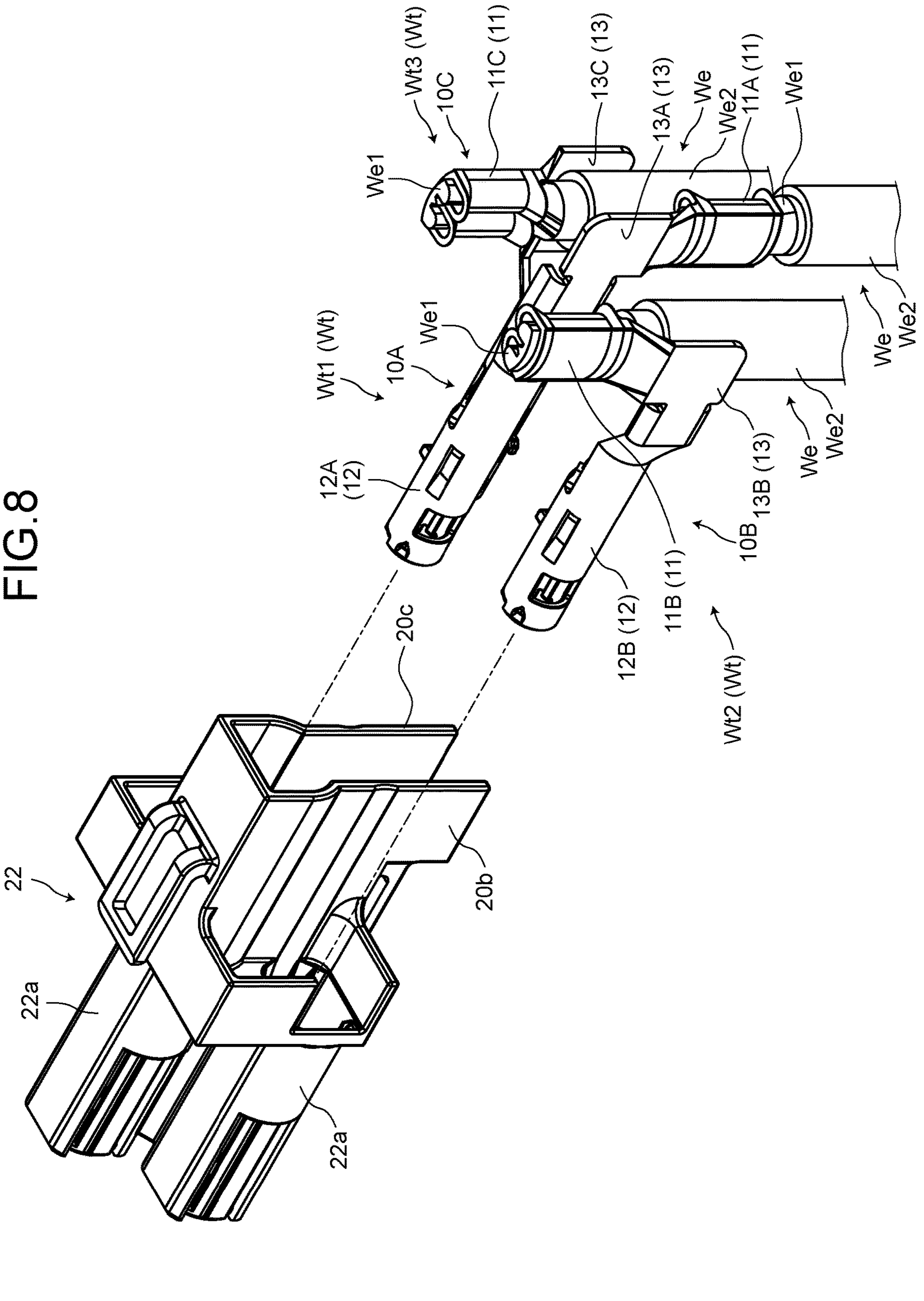
FIG. 8 is an exploded perspective view of the terminal-equipped electric wire and the terminal holding member as viewed from a different angle.

In addition, the terminal fitting 10 includes a coupling portion 13 obtained by coupling the electric wire connection portion 11 and the terminal connection portion 12 (FIGS. 4, 7, and 8).

Figure 5:
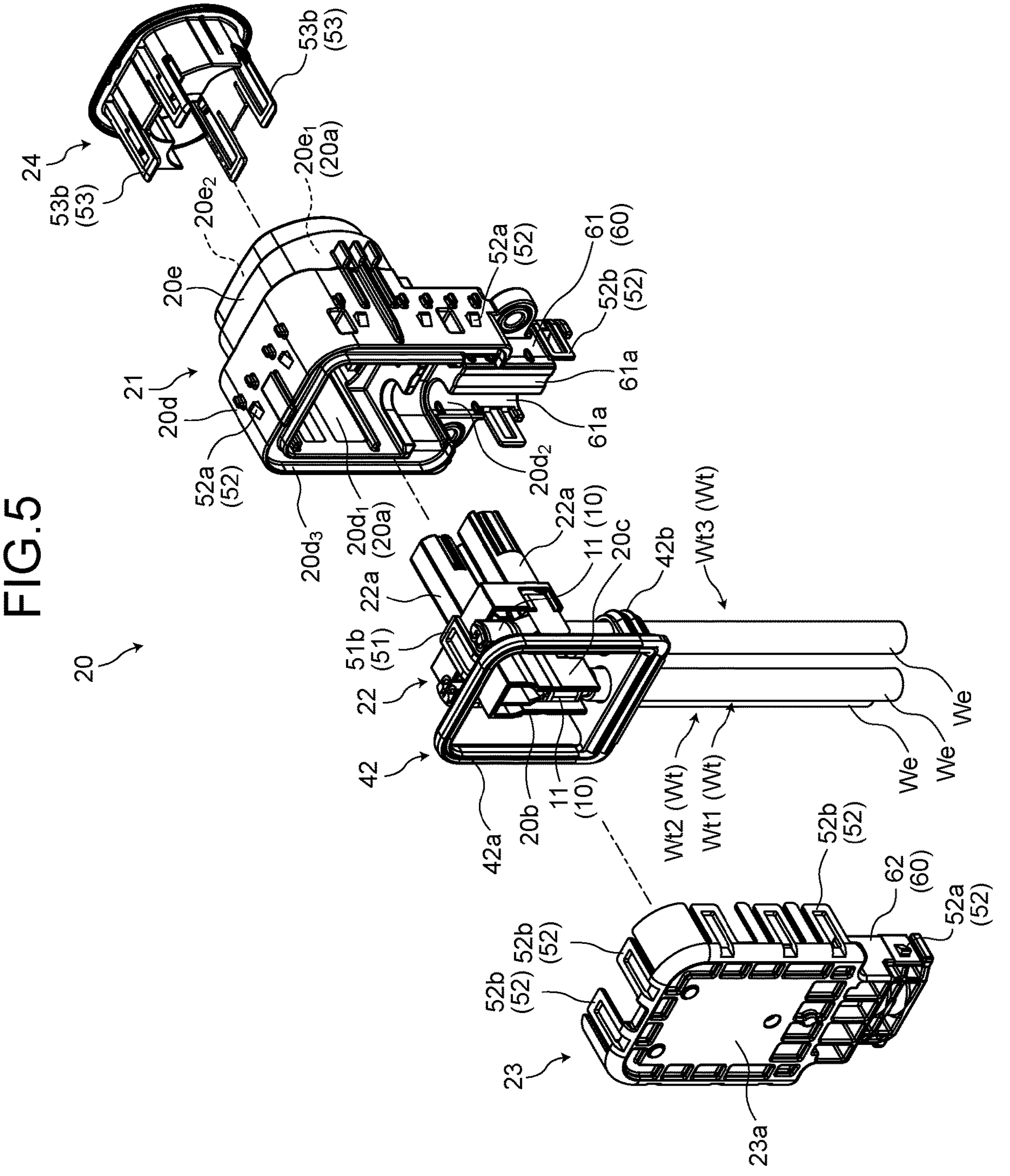
FIG. 5 is an exploded perspective view of the housing, and illustrates the housing together with a terminal-equipped electric wire.
Figure 6:
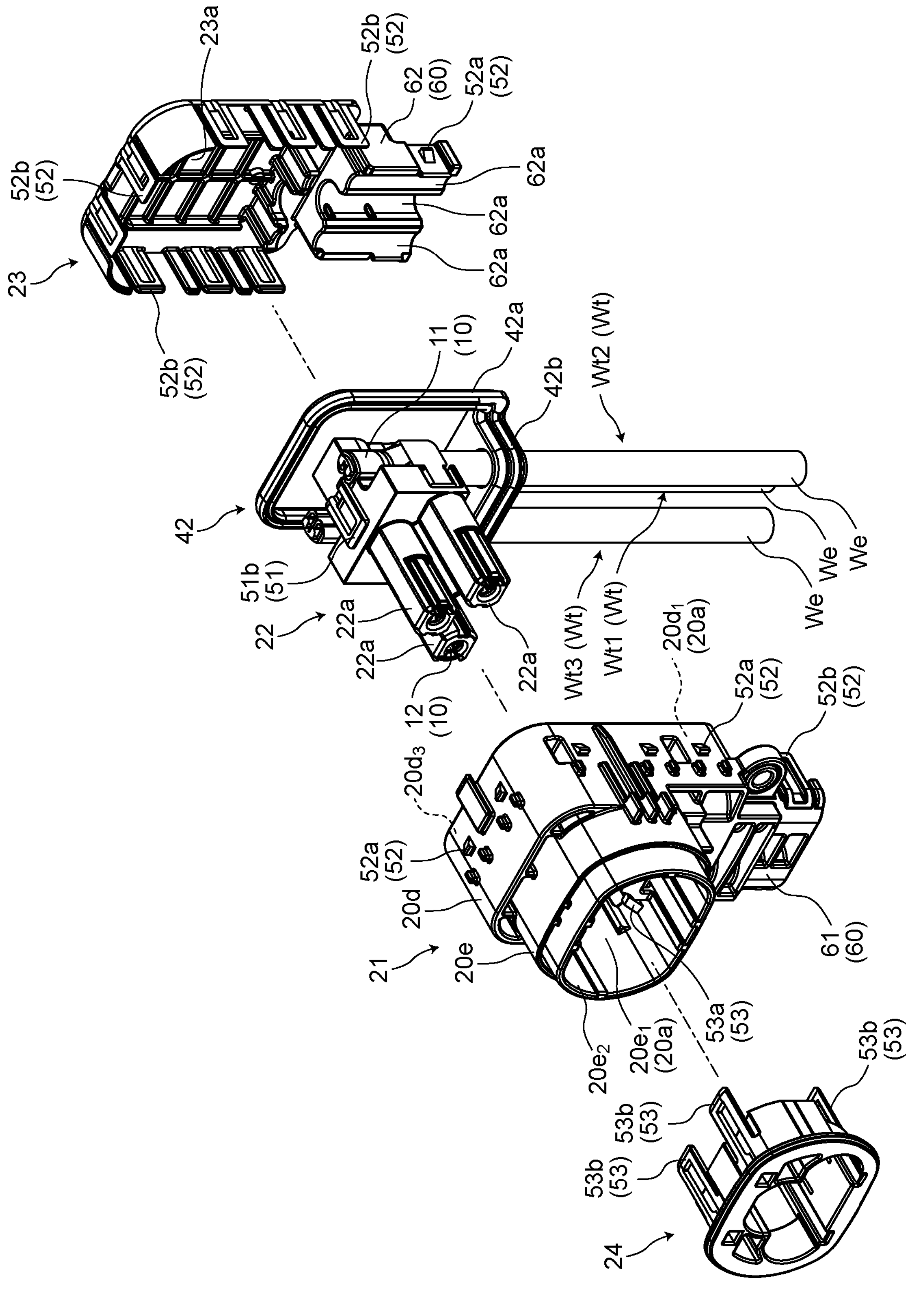
FIG. 6 is an exploded perspective view of the housing as viewed from another angle, and illustrates the housing together with the terminal-equipped electric wire.

In the housing 20, a plurality of terminal-equipped electric wires Wt including the set of terminal fittings 10 and the electric wire We are arranged in an arrangement direction orthogonal to the axial direction of the electric wire We and the protruding direction of the terminal connection portion 12, the protruding directions of the respective terminal connection portions 12 of the plurality of terminal-equipped electric wires Wt are aligned in the same direction, and the drawing directions of the electric wires We from the respective electric wire connection portions 11 of the plurality of terminal-equipped electric wires Wt are aligned in the same direction and housed in an inner containment chamber (hereinafter, referred to as a "terminal containment chamber") 20*a* (FIGS. 4 to 6).

In the connector 1 of the present embodiment, as the terminal fitting 10 to be accommodated in the terminal containment chamber 20*a*, there are provided at least a first terminal fitting 10A having a first electric wire connection portion 11A, a first terminal connection portion 12A, and a first coupling portion 13A as the electric wire connection portion 11, the terminal connection portion 12, and the coupling portion 13, and a second terminal fitting 10B having a second electric wire connection portion 11B, a second terminal connection portion 12B, and a second coupling portion 13B as the electric wire connection portion 11, the terminal connection portion 12, and the coupling portion 13 (FIGS. 4, 7, and 8).

In the first terminal fitting 10A, the first terminal connection portion 12A is disposed on the opposite side of the first electric wire connection portion 11A from the drawing direction of the electric wire We when viewed from the first electric wire connection portion 11A (FIGS. 4, 7, and 8). Therefore, the first terminal fitting 10A is formed in a shape in which the first coupling portion 13A protrudes from the first electric wire connection portion 11A to the opposite side to the drawing direction of the electric wire We, and the first terminal connection portion 12A protrudes from the first coupling portion 13A in the fitting connection direction.

Further, the first terminal fitting 10A is formed in a shape in which the axis of the electric wire We drawn out from the first electric wire connection portion 11A and the central axis of the first terminal connection portion 12A in the protruding direction are arranged on the same plane P1 (FIG. 4).

In the first terminal fitting 10A shown here, the first coupling portion 13A is arranged on substantially the same plane as a bottom portion of the first electric wire connection portion 11A, and the first terminal connection portion 12A is coupled to the first coupling portion 13A such that the central axis is arranged on the same plane P1 as the axis of the electric wire We drawn out from the first electric wire connection portion 11A. The first coupling portion 13A illustrated here is formed in an L shape connecting the two piece portions, one piece portion protrudes from the bottom portion of the first electric wire connection portion 11A to the side opposite to the drawing direction of the electric wire We, and the other piece portion protrudes from the end portion in the protruding direction toward the fitting connection direction. The main body of the first coupling portion 13A is formed in a flat plate shape, but is connected to the first electric wire connection portion 11A side and the first terminal connection portion 12A side at arc-shaped ends matching the respective shapes of the first electric wire connection portion 11A and the first terminal connection portion 12A. The first terminal connection portion 12A protrudes in the fitting connection direction from an end of the other piece portion of the first coupling portion 13A on the protruding direction side.

In the second terminal fitting 10B, the second terminal connection portion 12B is disposed on the drawing direction side of the electric wire We with respect to the second electric wire connection portion 11B as viewed from the second electric wire connection portion 11B (FIGS. 4 and 8). Therefore, the second terminal fitting 10B is formed in a shape in which the second coupling portion 13B protrudes from the second electric wire connection portion 11B to the drawing direction side of the electric wire We and the second terminal connection portion 12B protrudes from the second coupling portion 13B in the fitting connection direction. Then, the second terminal connection portion 12B is arranged at a position overlapping a coating We2 of the electric wire We drawn out from the second electric wire connection portion 11B as viewed in the protruding direction (FIG. 4).

Figure 9:
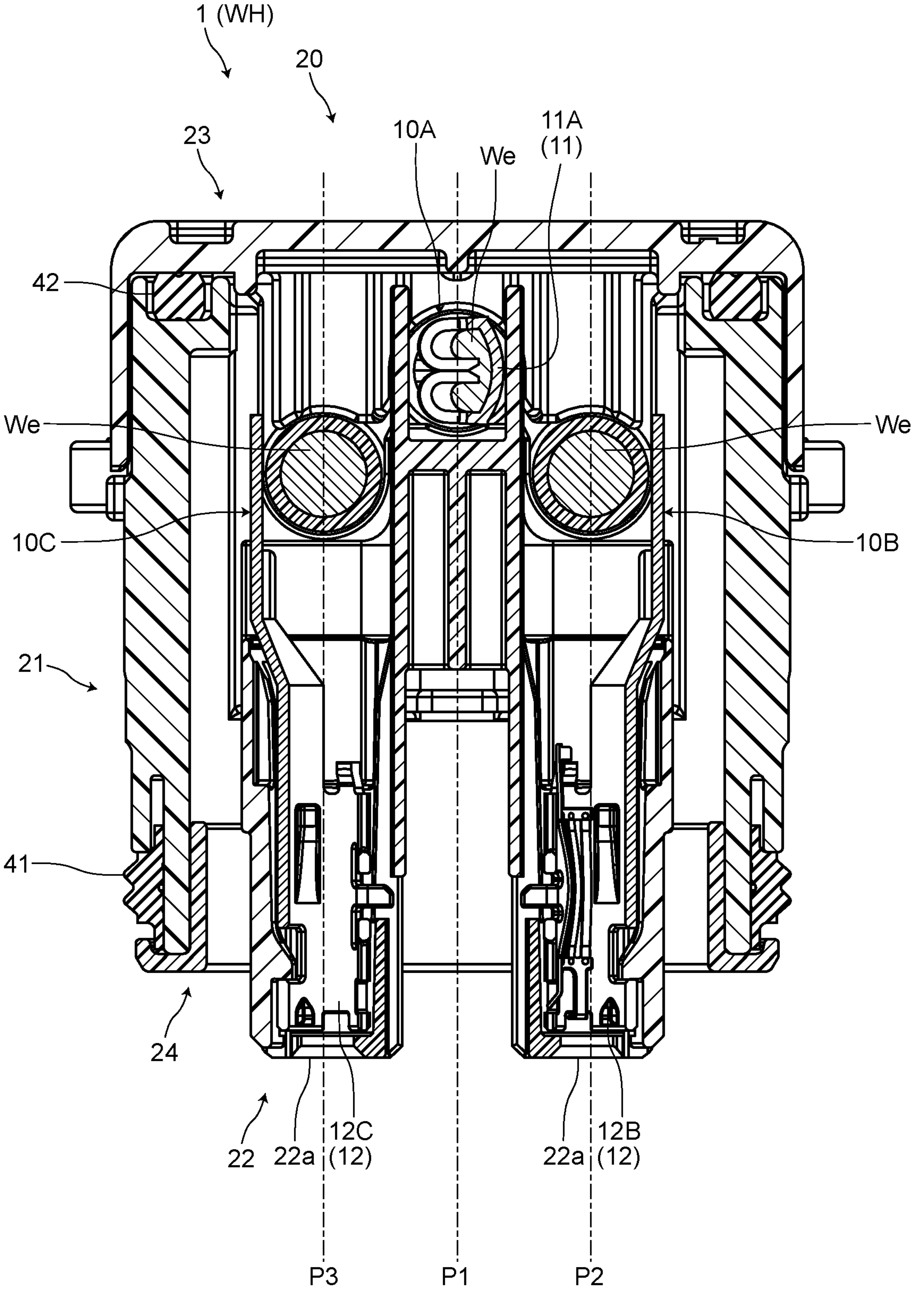
FIG. 9 is a cross-sectional view taken along a line X-X of FIG. 3.

Further, the second terminal fitting 10B is formed in a shape in which the axis of the electric wire We drawn out from the second electric wire connection portion 11B and the central axis of the second terminal connection portion 12B in the protruding direction are arranged on the same plane P2 (FIG. 9).

In the second terminal fitting 10B illustrated here, the second coupling portion 13B is arranged at a position covering the coating We2 of the electric wire We drawn out from the second electric wire connection portion 11B, and the second terminal connection portion 12B is coupled to the second coupling portion 13B such that the central axis is arranged on the same plane P2 as the axis of the electric wire We. The second coupling portion 13B illustrated here is formed in an L shape in which the respective end portions are offset and connected according to a position of a bottom portion of the second electric wire connection portion 11B and a position of an outer peripheral surface of the second terminal connection portion 12B. In the second coupling portion 13B, one end portion is protruded toward the drawing direction side of the electric wire We while being offset from the bottom portion of the second electric wire connection portion 11B in consideration of a thickness of the coating We2, and is connected to a plate-like main body covering the outer peripheral surface of the electric wire We (outer peripheral surface of the coating We2). In the second coupling portion 13B, the other end portion protrudes in the fitting connection direction while being offset from the main body in consideration of the position of the outer peripheral surface of the second terminal connection portion 12B. The second terminal connection portion 12B protrudes from the other end portion thereof toward the fitting connection direction.

In the terminal containment chamber 20*a* of the housing 20, the first terminal fitting 10A and the second terminal fitting 10B are arranged side by side in the previous arrangement direction in a state where the second terminal connection portion 12B is offset from the first terminal connection portion 12A in the drawing direction of the electric wire We. In the terminal containment chamber 20*a*, the second electric wire connection portion 11B of the second terminal fitting 10B is disposed adjacent to the first terminal connection portion 12A of the first terminal fitting 10A, and the second terminal connection portion 12B of the second terminal fitting 10B is disposed adjacent to the first electric wire connection portion 11A of the first terminal fitting 10A (FIG. 4).

Here, in the terminal containment chamber 20*a*, in order to prevent contact between the first terminal fitting 10A and the second terminal fitting 10B adjacent to each other, a partition wall 20*b* (a first partition wall 20*b* to be described later) partitioning between the first terminal fitting 10A and the second terminal fitting 10B is provided (FIGS. 4, 7, and 8). Therefore, the second coupling portion 13B of the second terminal fitting 10B is arranged to face the coating We2 of the electric wire We drawn out from the second electric wire connection portion 11B on the opposite side to the first terminal fitting 10A side (FIG. 4). As described above, in this connector 1, since the second coupling portion 13B does not interfere with the partition wall 20*b*, the second terminal fitting 10B can be arranged close to the first terminal fitting 10A in the arrangement direction, and an increase in the overall size in the arrangement direction can be suppressed.

Specifically, the connector 1 of the present embodiment includes three terminal-equipped electric wires Wt. For example, the connector 1 can be configured to include another second terminal fitting 10B as the terminal fitting 10 in addition to the first terminal fitting 10A and the second terminal fitting 10B described above. That is, the connector 1 includes one first terminal-equipped electric wire Wt1 provided with the first terminal fitting 10A and two second terminal-equipped electric wires Wt2 provided with the second terminal fitting 10B (not illustrated). In this case, in the terminal containment chamber 20*a* of the housing 20, similarly to the one second terminal fitting 10B, in a state where the second terminal connection portion 12B of the other second terminal fitting 10B is offset in the drawing direction of the electric wire We with respect to the first terminal connection portion 12A, the other second terminal fitting 10B is arranged side by side on the opposite side of the one second terminal fitting 10B in the arrangement direction with respect to the first terminal fitting 10A. In the terminal containment chamber 20*a*, the second electric wire connection portions 11B of the respective second terminal fittings 10B are arranged on both sides of the first terminal connection portion 12A of the first terminal fitting 10A, and the second terminal connection portions 12B of the respective second terminal fittings 10B are arranged on both sides of the first electric wire connection portion 11A of the first terminal fitting 10A.

In order to prevent contact between the first terminal fitting 10A and the second terminal fitting 10B adjacent to each other, the terminal containment chamber 20*a* is provided with a partition wall that partitions between the first terminal fitting 10A and one second terminal fitting 10B and a partition wall that partitions between the first terminal fitting 10A and the other second terminal fitting 10B. However, since the connector 1 of the present embodiment is configured to include one first terminal fitting 10A and two second terminal fittings 10B, there is a need to separate the other second terminal fitting 10B from the first terminal fitting 10A in the arrangement direction in order to prevent interference between the second coupling portion 13B of the other second terminal fitting 10B and the partition wall, which may cause an increase in the overall size in the arrangement direction.

Therefore, the connector 1 of the present embodiment is desirably configured to include, as the terminal fitting 10, in addition to the one first terminal fitting 10A and the one second terminal fitting 10B described above, a third terminal fitting 10C including a third electric wire connection portion 11C, a third terminal connection portion 12C, and a third coupling portion 13C as the electric wire connection portion 11, the terminal connection portion 12, and the coupling portion 13 (FIGS. 4, 7, and 8). That is, it is desirable that the connector 1 includes a first terminal-equipped electric wire Wt1 provided with the first terminal fitting 10A, a second terminal-equipped electric wire Wt2 provided with the second terminal fitting 10B, and a third terminal-equipped electric wire Wt3 provided with the third terminal fitting 10C one by one, and is arranged as follows.

In the third terminal fitting 10C, similarly to the second terminal fitting 10B, the third terminal connection portion 12C is disposed closer to the drawing direction side of the electric wire We than the third electric wire connection portion 11C when viewed from the third electric wire connection portion 11C (FIGS. 4, 7, and 8). Therefore, the third terminal fitting 10C is formed in a shape in which the third coupling portion 13C protrudes from the third electric wire connection portion 11C toward the drawing direction of the electric wire We, and the third terminal connection portion 12C protrudes from the third coupling portion 13C in the fitting connection direction. Then, the third terminal connection portion 12C is arranged at a position overlapping the coating We2 of the electric wire We drawn out from the third electric wire connection portion 11C as viewed in the protruding direction.

Further, similarly to the second terminal fitting 10B, the third terminal fitting 10C is formed in a shape in which the axis of the electric wire We drawn out from the third electric wire connection portion 11C and the central axis of the third terminal connection portion 12C in the protruding direction are arranged on the same plane P3 (FIG. 9).

In the third terminal fitting 10C shown here, similarly to the second terminal fitting 10B, the third coupling portion 13C is arranged at a position covering the coating We2 of the electric wire We drawn out from the third electric wire connection portion 11C, and the third terminal connection portion 12C is coupled to the third coupling portion 13C such that the central axis is arranged on the same plane P2 as the axis of the electric wire We. The third coupling portion 13C illustrated here is formed in an L shape in which the respective end portions are offset and connected according to a position of a bottom portion of the third electric wire connection portion 11C and a position of an outer peripheral surface of the third terminal connection portion 12C. In the third coupling portion 13C, one end portion is protruded toward the drawing direction side of the electric wire We while being offset from the bottom portion of the third electric wire connection portion 11C in consideration of a thickness of the coating We2, and is connected to a plate-like main body covering the outer peripheral surface of the electric wire We (outer peripheral surface of the coating We2). In the third coupling portion 13C, the other end portion protrudes in the fitting connection direction while being offset from the main body in consideration of the position of the outer peripheral surface of the third terminal connection portion 12C. The third terminal connection portion 12C protrudes from the other end portion thereof toward the fitting connection direction.

However, in the terminal containment chamber 20*a* of the housing 20, in a state where the third terminal connection portion 12C is offset from the first terminal connection portion 12A in the drawing direction of the electric wire We, the third terminal fitting 10C is arranged side by side on the opposite side of the second terminal fitting 10B in the arrangement direction with respect to the first terminal fitting 10A. Therefore, in the terminal containment chamber 20*a*, the second electric wire connection portion 11B of the second terminal fitting 10B and the third electric wire connection portion 11C of the third terminal fitting 10C are arranged on both sides of the first terminal connection portion 12A of the first terminal fitting 10A, and the second terminal connection portion 12B of the second terminal fitting 10B and the third terminal connection portion 12C of the third terminal fitting 10C are arranged on both sides of the first electric wire connection portion 11A of the first terminal fitting 10A (FIG. 4).

Here, in the terminal containment chamber 20*a*, in order to prevent contact between the first terminal fitting 10A and the third terminal fitting 10C adjacent to each other, a second partition wall 20*c* for partitioning between the first terminal fitting 10A and the third terminal fitting 10C is provided in addition to the previous partition wall 20*b* (first partition wall 20*b*) for preventing contact between the first terminal fitting 10A and the second terminal fitting 10B adjacent to each other (FIGS. 4, 7, and 8). As described above, in order to arrange the second terminal fitting 10B close to the first terminal fitting 10A in the arrangement direction, the second coupling portion 13B of the second terminal fitting 10B is arranged to face the coating We2 of the electric wire We drawn out from the second electric wire connection portion 11B on the opposite side to the first terminal fitting 10A side (FIG. 4). Similarly, the third coupling portion 13C of the third terminal fitting 10C is arranged to face the coating We2 of the electric wire We drawn out from the third electric wire connection portion 11C on the opposite side to the first terminal fitting 10A side (FIG. 4). As a result, in the connector 1, since the third coupling portion 13C also does not interfere with the partition wall (second partition wall 20*c*), the third terminal fitting 10C can be arranged close to the first terminal fitting 10A in the arrangement direction. Therefore, in the connector 1, since the second terminal fitting 10B and the third terminal fitting 10C can be arranged close to the first terminal fitting 10A in the arrangement direction, it is possible to further suppress an increase in size of the entire body in the arrangement direction as compared with a case where two second terminal fittings 10B are used.

In the connector 1, the housing 20 that accommodates the three terminal-equipped electric wires Wt (first terminal-equipped electric wire Wt1, second terminal-equipped electric wire Wt2, and third terminal-equipped electric wire Wt3) is configured as follows.

The housing 20 is made of an insulating material such as a synthetic resin.

The housing 20 includes a first cylindrical portion 20*d* formed in a cylindrical shape, and a second cylindrical portion 20*e* having a cylindrical shape protruding from one end of the first cylindrical portion 20*d* in a cylindrical axis direction with the cylindrical axis direction aligned with the cylindrical axis direction (FIGS. 1, 5, and 6). In the housing 20, a space $\mathbf{20}d_1$ inside the first cylindrical portion 20*d* and a space $\mathbf{20}e_1$ inside the second cylindrical portion 20*e* communicate with each other. In the housing 20, the respective inner spaces $\mathbf{20}d_1$ and $\mathbf{20}e_1$ are used as the terminal containment chamber 20*a*. Here, the electric wire connection portions 11 of all the terminal fittings 10 are accommodated in the space $\mathbf{20}d_1$ inside the first cylindrical portion 20*d*, and the terminal connection portions 12 of all the terminal fittings 10 are accommodated in the space $\mathbf{20}e_1$ inside the second cylindrical portion 20*e*.

The terminal of the electric wire We is also accommodated in the space $\mathbf{20}d_1$ inside the first cylindrical portion 20*d* together with the electric wire connection portion 11. In the first cylindrical portion 20*d*, a notch $\mathbf{20}d_2$ for drawing out the electric wire We from the space $\mathbf{20}d_1$ is formed (FIG. 5). The first cylindrical portion 20*d* illustrated here is formed in a rectangular cylindrical shape, and the notch $\mathbf{20}d_2$ is provided on one side thereof.

In the space $\mathbf{20}e_1$ inside the second cylindrical portion 20*e*, the terminal connection portion 12 is accommodated with the fitting connection direction to the counterpart connector terminal connection portion aligned with the cylindrical axis direction. In the space $\mathbf{20}e_1$ inside the second cylindrical portion 20*e* illustrated here, the respective terminal connection portions 12 of the two terminal fittings 10 (second terminal fitting 10B, third terminal fitting 10C) are accommodated side by side in a direction orthogonal to the cylindrical axis direction of the second cylindrical portion 20*e* (fitting connection direction of the terminal connection portion 12) and the drawing direction of the electric wire We from the electric wire connection portion 11, and the terminal connection portion 12 of the remaining one terminal fitting 10 (first terminal fitting 10A) is accommodated at an interval in a direction opposite to the drawing direction of the electric wire We with respect to an intermediate position of the two terminal connection portions 12 (FIGS. 1 and 3). That is, in the space $\mathbf{20}e_1$ inside the second cylindrical portion 20*e*, the terminal connection portions 12 of the three terminal fittings 10 are accommodated side by side at apex positions of triangles.

The housing 20 has a fitting portion to be fitted and connected to a through hole of a housing of an electric device. In the housing 20, the second cylindrical portion 20*e* is used as the fitting portion (FIG. 1). The fitting portion (second cylindrical portion 20*e*) is inserted into and fitted into the through hole of the housing along the fitting connection direction in the same direction as the fitting connection direction of the terminal connection portion 12 with respect to the counterpart connector terminal connection portion. The fitting portion (second cylindrical portion 20*e*) is removed from the through hole of the housing along a removal direction opposite to the fitting connection direction. The fitting portion (second cylindrical portion 20*e*) is formed in a cylindrical shape in which an insertion and removal direction (insertion direction, insertion and removal direction) with respect to the through hole is a cylindrical axis direction. The fitting portion (second cylindrical portion 20*e*) illustrated here is formed in an elongated cylindrical shape whose cross section orthogonal to the insertion and removal direction is an elongated annular shape.

Figure 2:
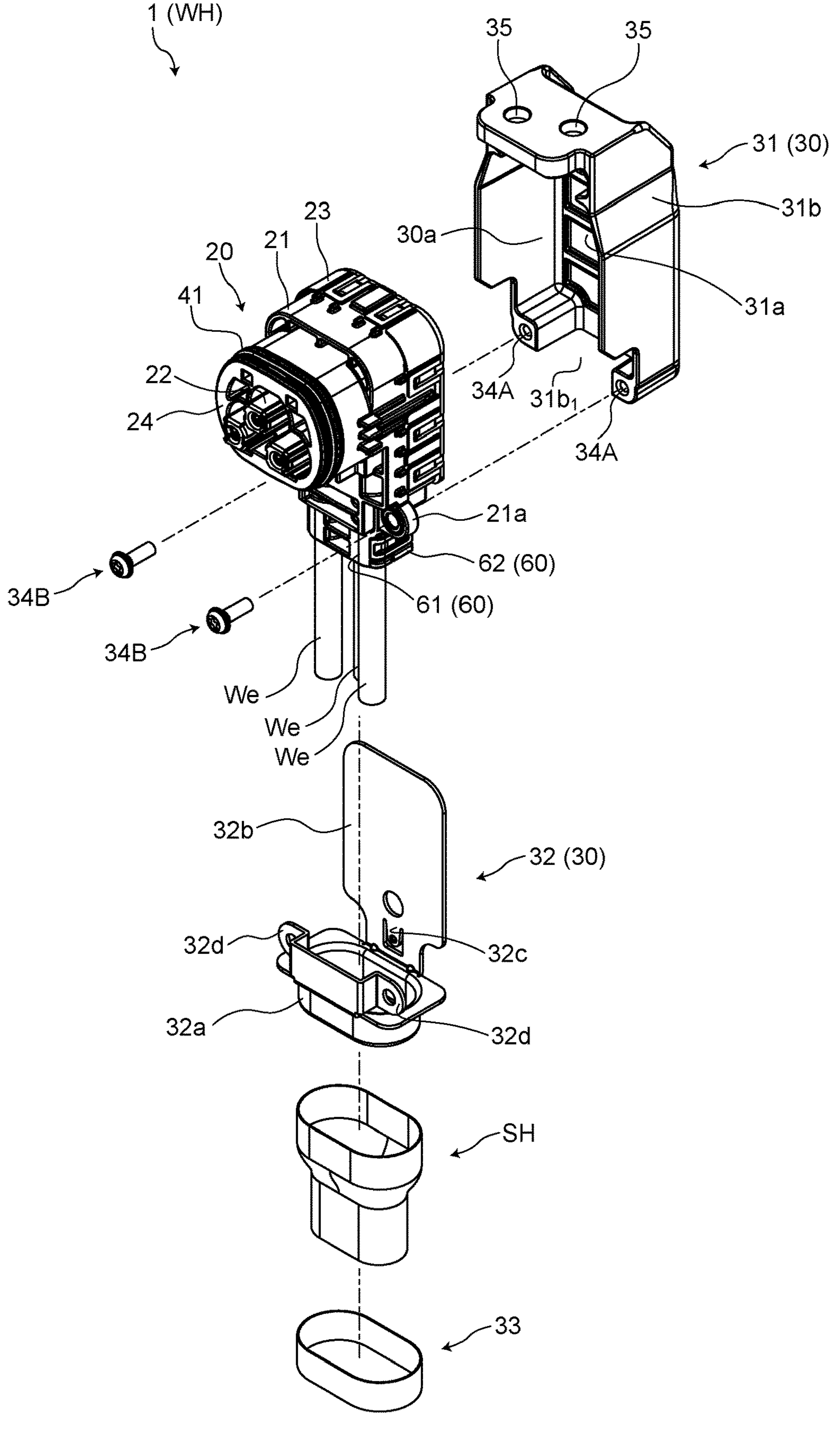
FIG. 2 is an exploded perspective view illustrating the connector with a shield shell removed according to the embodiment.

The connector 1 includes an annular seal member 41 that fills an annular gap between an outer peripheral surface of the fitting portion (second cylindrical portion 20*e*) and an inner peripheral surface of the through hole in the housing to achieve waterproof and dustproof therebetween (FIGS. 1 to 3). The seal member 41 is made of an elastic member such as synthetic rubber. Then, the seal member 41 is assembled to the outer peripheral surface of the fitting portion (second cylindrical portion 20*e*).

The housing 20 of the present embodiment includes a housing body 21 provided with such a first cylindrical portion 20*d* and a second cylindrical portion 20*e* (FIGS. 1 to 6).

In the housing body 21, all the terminal-equipped electric wires Wt (first terminal-equipped electric wire Wt1, second terminal-equipped electric wire Wt2, and third terminal-equipped electric wire Wt3) are accommodated in the terminal containment chamber 20*a* from the opening (the opening is an opening at an end opposite to the fitting connection direction, and is hereinafter referred to as "insertion port") $\mathbf{20}d_3$ (FIGS. 5 and 6) at the end of the first cylindrical portion 20*d* in the cylinder axis direction. In the housing body 21, an end portion of the terminal connection portion 12 on the fitting connection direction side protrudes from the opening (opening of the end portion on the fitting connection direction side) $\mathbf{20}e_2$ (FIGS. 1, 5, and 6) of the end portion of the fitting portion (second cylindrical portion 20*e*) in the cylinder axis direction. The terminal fitting 10 is held in the terminal containment chamber 20*a*.

The housing 20 of the present embodiment includes a terminal holding member 22 that is housed in the terminal containment chamber 20*a* and holds the terminal fitting 10 in the terminal containment chamber 20*a* (FIGS. 1 to 8). The terminal holding member 22 is made of an insulating material such as synthetic resin.

In the terminal holding member 22, a cylindrical terminal containment portion 22*a* that houses and holds the terminal connection portion 12 is provided for each terminal fitting 10 (FIGS. 1, 3, and 5 to 8). In the terminal holding member 22, three terminal containment portions 22*a* are formed in accordance with the arrangement of the respective terminal connection portions 12 of the three terminal fittings 10 described above.

The terminal holding member 22 is provided with two wall portions that sandwich the first electric wire connection portion 11A and the first coupling portion 13A of the first terminal fitting 10A in the arrangement direction. In the terminal holding member 22, the second electric wire connection portion 11B and the second coupling portion 13B in the second terminal fitting 10B are arranged together with the electric wire We adjacent to the first electric wire connection portion 11A and the first coupling portion 13A with one wall portion interposed therebetween, and thus, this one wall portion is used as the first partition wall 20*b* described above (FIGS. 4, 7, and 8). In addition, in the terminal holding member 22, the third electric wire connection portion 11C and the third coupling portion 13C of the third terminal fitting 10C are arranged, together with the electric wire We, adjacent to the first electric wire connection portion 11A and the first coupling portion 13A with the other wall portion interposed therebetween, and thus, the other wall portion is used as the second partition wall 20*c* described above (FIGS. 4, 7, and 8).

The terminal holding member 22 is held by the housing body 21 in the terminal containment chamber 20*a*. For example, the housing body 21 and the terminal holding member 22 are held between each other by a plurality of lock mechanisms 51 using claw portions or the like that hook each other (FIGS. 5 and 6). The lock mechanism 51 includes a claw-like first locking portion (not illustrated) and a second locking portion 51*b* that is locked to the first locking portion to hold the housing body 21 and the terminal holding member 22 at an assembly completion position. Here, the first locking portion is provided on the housing body 21, and the second locking portion 51*b* is provided on the terminal holding member 22.

In addition, the housing 20 of the present embodiment includes a holding portion (hereinafter, referred to as "electric wire holding portion") 60 that guides and holds all the electric wires We drawn out from the notch $\mathbf{20}d_2$ of the first cylindrical portion 20*d* in the drawing direction (FIGS. 1 to 3, 5, and 6). In the housing 20, all the electric wires We are drawn out from the electric wire holding portion 60. The housing body 21 includes a first holding portion 61 that serves as one end of the electric wire holding portion 60. In the first holding portion 61, a guide groove 61*a* for guiding the electric wire We in the drawing direction is formed for each electric wire We (FIG. 5).

In addition, the housing 20 of the present embodiment includes a cover member 23 that is assembled to the housing body 21 to block the insertion port $\mathbf{20}d_3$ of the first cylindrical portion 20*d* (FIGS. 2, 3, 5, and 6). The cover member 23 is made of an insulating material such as synthetic resin.

The cover member 23 has a plate-like blockage portion 23*a* that blocks the insertion port $\mathbf{20}d_3$ of the first cylindrical portion 20*d* (FIGS. 5 and 6). The blockage portion 23*a* is formed in a rectangular plate shape so as to block the rectangular insertion port $\mathbf{20}d_3$ of the first cylindrical portion 20*d*. The cover member 23 is assembled to the housing body 21 while bringing the blockage portion 23*a* close to the insertion port $\mathbf{20}d_3$ in the fitting connection direction of the fitting portion (second cylindrical portion 20*e*).

The connector 1 includes a seal member 42 that fills a gap between the first cylindrical portion 20*d* and the blockage portion 23*a* to achieve waterproof and dustproof therebetween (FIGS. 4 to 6). The seal member 42 is made of an elastic member such as synthetic rubber. The seal member 42 includes a first seal portion 42*a* that is brought into close contact with an inner peripheral surface of an end portion of the first cylindrical portion 20*d* on the insertion port $\mathbf{20}d_3$ side and is brought into close contact with a wall surface of an outer peripheral edge of the blockage portion 23*a* on the terminal containment chamber 20*a* side to achieve waterproof and dustproof at the insertion port $\mathbf{20}d_3$ of the first cylindrical portion 20*d* (FIGS. 5 and 6). Further, the seal member 42 includes a second seal portion 42*b* that blocks the notch $\mathbf{20}d_2$ of the first cylindrical portion 20*d* while the electric wire We is inserted in a close contact state for each electric wire We to achieve waterproof and dustproof in the notch $\mathbf{20}d_2$ (FIGS. 5 and 6). The seal member 42 is assembled to the first cylindrical portion 20*d* together with all the terminal-equipped electric wires Wt (first terminal-equipped electric wire Wt1, second terminal-equipped electric wire Wt2, and third terminal-equipped electric wire Wt3).

The cover member 23 is held by the housing body 21 at an assembly completion position. For example, the housing body 21 and the cover member 23 are held between each other by a plurality of lock mechanisms 52 using claw portions or the like that hook each other (FIGS. 5 and 6). The lock mechanism 52 includes a claw-like first locking portion 52*a* and a second locking portion 52*b* that is locked to the first locking portion 52*a* to hold the housing body 21 and the cover member 23 at the assembly completion position. Here, the lock mechanisms 52 each configured by the first locking portion 52*a* provided on the housing body 21 and the second locking portion 52*b* provided on the cover member 23 are provided at a plurality of locations on the first cylindrical portion 20*d* side, and the lock mechanisms 52 each configured by the first locking portion 52*a* provided on the cover member 23 and the second locking portion 52*b* provided on the housing body 21 are provided at a plurality of locations on the first holding portion 61 side.

Further, the cover member 23 includes a second holding portion 62 that serves as one end of the electric wire holding portion 60 together with the first holding portion 61 (FIGS. 2, 5, and 6). In the second holding portion 62, a guide groove 62*a* for guiding the electric wire We in the drawing direction is formed for each electric wire We (FIG. 6). In the electric wire holding portion 60, when the assembly of the housing body 21 and the cover member 23 has been completed, a passage of the electric wire We is formed by the guide groove 61*a* of the first holding portion 61 and the guide groove 62*a* of the second holding portion 62.

The electric wire holding portion 60 is formed by coupling the first holding portion 61 of the housing body 21 and the second holding portion 62 of the cover member 23 at the assembly completion position of the housing body 21 and the cover member 23. The first holding portion 61 and the second holding portion 62 are assembled to each other in the same direction as the assembling direction of the housing body 21 and the cover member 23.

In addition, the housing 20 of the present embodiment includes a front holder 24 (FIGS. 1 to 3, 5, and 6) to be fitted into the opening $\mathbf{20}e_2$ of the fitting portion (second cylindrical portion 20*e*). The front holder 24 is made of an insulating material such as synthetic resin. The front holder 24 is fitted into the opening $\mathbf{20}e_2$ of the fitting portion (second cylindrical portion 20*e*) while exposing the terminal containment portion 22*a* in which the terminal connection portion 12 is accommodated (FIG. 1).

The front holder 24 is held by the housing body 21 at the assembly completion position. For example, the housing body 21 and the front holder 24 are held between each other by a plurality of lock mechanisms 53 using claw portions or the like that hook each other (FIGS. 5 and 6). The lock mechanism 53 includes a claw-like first locking portion 53*a* and a second locking portion 53*b* that is locked to the first locking portion 53*a* to hold the housing body 21 and the front holder 24 at the assembly completion position. Here, the first locking portion 53*a* is provided on the housing body 21, and the second locking portion 53*b* is provided on the front holder 24.

The shield shell 30 is provided to suppress intrusion of noise into the housing 20 and to release the noise carried on a shield material SH from the housing of the electric device to the vehicle body. Therefore, the shield shell 30 is made of a conductive material such as metal. The shield shell 30 has a containment chamber (hereinafter, referred to as "housing containment chamber") 30*a* that covers the housing 20 from the outside to contain the housing 20 (FIGS. 1 and 2). Further, the shield shell 30 physically and electrically connects the shield material SH, and physically and electrically connects the shield material SH to a housing as an object to be fixed.

The shield shell 30 includes a first shield shell member 31 and a second shield shell member 32 assembled to each other (FIGS. 1 and 2).

The housing containment chamber 30*a* is formed in the first shield shell member 31 (FIG. 2). The first shield shell member 31 includes a main wall body 31*a* that covers the housing 20 from a side opposite to the fitting portion (second cylindrical portion 20*e*), and a peripheral wall body 31*b* that is suspended from a peripheral edge of the main wall body 31*a* in the fitting connection direction of the fitting portion (second cylindrical portion 20*e*) and covers the housing 20 from the side (FIGS. 1 and 2). The first shield shell member 31 uses a space surrounded by the main wall body 31*a* and the peripheral wall body 31*b* as the housing containment chamber 30*a*.

In the peripheral wall body 31*b* shown here, the drawing direction side of the electric wire We is notched, and the electric wire holding portion 60 of the housing 20 protrudes outward from the notch $\mathbf{31}b_1$ (FIG. 2).

The second shield shell member 32 includes a cylindrical portion 32*a* having a cylindrical shape that surrounds the electric wire holding portion 60 protruding outward from the notch $\mathbf{31}b_1$ of the first shield shell member 31 from the outside, and a plate-like connection portion 32*b* that is interposed between the blockage portion 23*a* of the cover member 23 and the main wall body 31*a* of the first shield shell member 31 and physically and electrically connected to the main wall body 31*a* (FIG. 2).

The shield material SH is physically and electrically connected to an outer peripheral surface of the cylindrical portion 32*a* by covering an outer peripheral surface of the cylindrical portion 32*a* with an end portion of the shield material SH and further crimping an annular caulking member 33 covered from the outer side thereof (FIG. 2). The connection portion 32*b* has an elastic contact portion 32*c* that is elastically deformable (FIG. 2), and when the first shield shell member 31 and the second shield shell member 32 are at the assembly completion position, the elastic contact portion 32*c* is pressed against a wall surface of the main wall body 31*a* by a resilient force.

In the shield shell 30, two female screw portions 34A in which the fitting connection direction of the fitting portion (second cylindrical portion 20*e*) is a screw axis direction are formed in the first shield shell member 31, and the first shield shell member 31 and the second shield shell member 32 are screwed and fixed by screwing a male screw member 34B inserted into a through hole of each female screw portion 34A of a fixing portion 32*d* of the second shield shell member 32 into the female screw portion 34A (FIG. 2). In the shield shell 30 illustrated here, a fixing portion 21*a* of the housing body 21 is sandwiched between the fixing portion 32*d* and the female screw portion 34A, and the male screw member 34B inserted into the through-hole of each of the fixing portions 32*d* and 21*a* is screwed into the female screw portion 34A to fasten and fix the housing body 21 together (FIGS. 1 and 2).

The shield shell 30 is physically and electrically connected to the housing of the electric device by screwing and fixing the peripheral wall body 31*b* of the first shield shell member 31 to the housing of the electric device. For example, two female screw portions (not illustrated) are formed on an attachment surface of the housing, and the peripheral wall body 31*b* is screwed and fixed by a screw shaft orthogonal to a fitting connection direction of the fitting portion (second cylindrical portion 20*e*). In the peripheral wall body 31*b*, a through hole 35 for inserting a male screw member (not illustrated) to be screwed into the female screw portion is formed for each female screw portion (FIGS. 1 and 2).

As described above, in the connector 1 of the present embodiment, in the two terminal fittings 10 adjacent to each other in the arrangement direction, the electric wire connection portion 11 and the terminal connection portion 12 of one terminal fitting 10 are arranged side by side in this order in the direction opposite to the drawing direction (axial direction) of the electric wire We, and the electric wire connection portion 11 and the terminal connection portion 12 of the other terminal fitting 10 are arranged side by side in this order in the drawing direction (axial direction) of the electric wire We. In the connector 1, the terminal connection portion 12 of one terminal fitting 10 is offset from the terminal connection portion 12 of the other terminal fitting 10 in the drawing direction (axial direction) of the electric wire We. Therefore, in the connector 1 of the present embodiment, a connection region between the electric wire connection portion 11 and the electric wire We can be secured in the other terminal fitting 10 in which the terminal connection portion 12 is offset in the drawing direction (axial direction) of the electric wire We without enlarging the volume of the terminal containment chamber 20*a* of the housing 20 in the drawing direction (axial direction) of the electric wire We. Therefore, the connector 1 can suppress an increase in size of the housing in the drawing direction (axial direction) of the electric wire We, and can suppress an increase in size of the entire body in the drawing direction (axial direction).

In the connector according to the present embodiment, the arrangement of the second electric wire connection portion and the second terminal connection portion of the second terminal fitting is replaced with respect to the arrangement of the first electric wire connection portion and the first terminal connection portion of the first terminal fitting, and the second terminal connection portion is offset in the drawing direction of the electric wire with respect to the first terminal connection portion. That is, in the connector according to the present invention, in the containment chamber of the housing, the second electric wire connection portion of the second terminal fitting can be disposed adjacent to the first electric wire connection portion of the first terminal fitting, and the second terminal connection portion of the second terminal fitting can be disposed adjacent to the first electric wire connection portion of the first terminal fitting. Therefore, in the connector according to the present invention, there is no need to enlarge a capacity of the containment chamber of the housing in the electric wire drawing direction (axial direction) only to secure a connection region between the second electric wire connection portion of the second terminal fitting and the electric wire, and it is possible to suppress an increase in size of the housing in the electric wire drawing direction. Therefore, the connector according to the present invention can suppress an increase in size of the entire body in the drawing direction (axial direction) of the electric wire.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A connector comprising:

a terminal fitting including: an electric wire connection portion that causes an electric wire to which a core wire of a terminal is physically and electrically connected to be drawn out in an axial direction; a terminal connection portion that is a portion protruding in a direction orthogonal to the axial direction and is inserted into a counterpart connector to be physically and electrically connected to an electrical connection target of the counterpart connector; and a coupling portion that couples the electric wire connection portion and the terminal connection portion; and a housing in which a plurality of terminal-equipped electric wires including a set of the terminal fittings and the electric wires are arranged in an arrangement direction orthogonal to the axial direction and the orthogonal direction, protruding directions of the respective terminal connection portions of the plurality of terminal-equipped electric wires are aligned in the same direction, and drawing directions of the electric wires from the respective electric wire connection portions of the plurality of terminal-equipped electric wires are aligned in the same direction and accommodated in an inner containment chamber, wherein a first terminal fitting including a first electric wire connection portion, a first terminal connection portion, and a first coupling portion as the electric wire connection portion, the terminal connection portion, and the coupling portion, and a second terminal fitting including a second electric wire connection portion, a second terminal connection portion, and a second coupling portion as the electric wire connection portion, the terminal connection portion, and the coupling portion are provided as the terminal fitting, the first terminal fitting causes the first coupling portion to protrude from the first electric wire connection portion to a side opposite to the drawing direction and causes the first terminal connection portion to protrude from the first coupling portion in the protruding direction, the second terminal fitting causes the second coupling portion to protrude from the second electric wire connection portion toward the drawing direction and causes the second terminal connection portion to protrude from the second coupling portion in the protruding direction, the second terminal connection portion is disposed at a position overlapping a coating of the electric wire drawn out from the second electric wire connection portion when viewed in the protruding direction of the second terminal connection portion, and in the containment chamber, the first terminal fitting and the second terminal fitting are arranged side by side in the arrangement direction in a state where the second terminal connection portion is offset from the first terminal connection portion in the drawing direction.

2. The connector according to claim 1, wherein the terminal fitting is formed in a shape in which an axis of the electric wire drawn out from the electric wire connection portion and a central axis of the terminal connection portion in the protruding direction are arranged on the same plane.

3. The connector according to claim 1, wherein the containment chamber is provided with a partition wall partitioning between the first terminal fitting and the second terminal fitting, and the second coupling portion is arranged to face the coating of the electric wire drawn out from the second electric wire connection portion on a side opposite to the first terminal fitting side.

4. The connector according to claim 2, wherein the containment chamber is provided with a partition wall partitioning between the first terminal fitting and the second terminal fitting, and the second coupling portion is arranged to face the coating of the electric wire drawn out from the second electric wire connection portion on a side opposite to the first terminal fitting side.

5. The connector according to claim 1, wherein two of the second terminal fittings are provided as the terminal fittings, and in the containment chamber, in a state where the second terminal connection portion of the other second terminal fitting is offset in the drawing direction with respect to the first terminal connection portion in the same manner as one of the second terminal fitting, the other second terminal fitting is arranged side by side on a side opposite to the one second terminal fitting in the arrangement direction with respect to the first terminal fitting.

6. The connector according to claim 2, wherein two of the second terminal fittings are provided as the terminal fittings, and in the containment chamber, in a state where the second terminal connection portion of the other second terminal fitting is offset in the drawing direction with respect to the first terminal connection portion in the same manner as one of the second terminal fitting, the other second terminal fitting is arranged side by side on a side opposite to the one second terminal fitting in the arrangement direction with respect to the first terminal fitting.

7. The connector according to claim 1, wherein a third terminal fitting including a third electric wire connection portion, a third terminal connection portion, and a third coupling portion as the electric wire connection portion, the terminal connection portion, and the coupling portion is provided as the terminal fitting, the third terminal fitting causes the third coupling portion to protrude from the third electric wire connection portion toward the drawing direction and causes the third terminal connection portion to protrude from the third coupling portion in the protruding direction, the third terminal connection portion is disposed at a position overlapping the coating of the electric wire drawn out from the third electric wire connection portion as viewed in a projecting direction of the third terminal connection portion, the containment chamber is provided with a first partition wall which arranges the third terminal fitting side by side on a side opposite to the second terminal fitting in the arrangement direction with respect to the first terminal fitting in a state where the third terminal connection portion is offset in the drawing direction with respect to the first terminal connection portion, and partitions between the first terminal fitting and the second terminal fitting, and a second partition wall which partitions between the first terminal fitting and the third terminal fitting, the second coupling portion is arranged to face the coating of the electric wire drawn out from the second electric wire connection portion on a side opposite to the first terminal fitting side, and the third coupling portion is arranged to face the coating of the electric wire drawn out from the third electric wire connection portion on a side opposite to the first terminal fitting side.

8. The connector according to claim 2, wherein a third terminal fitting including a third electric wire connection portion, a third terminal connection portion, and a third coupling portion as the electric wire connection portion, the terminal connection portion, and the coupling portion is provided as the terminal fitting, the third terminal fitting causes the third coupling portion to protrude from the third electric wire connection portion toward the drawing direction and causes the third terminal connection portion to protrude from the third coupling portion in the protruding direction, the third terminal connection portion is disposed at a position overlapping the coating of the electric wire drawn out from the third electric wire connection portion as viewed in a projecting direction of the third terminal connection portion, the containment chamber is provided with a first partition wall which arranges the third terminal fitting side by side on a side opposite to the second terminal fitting in the arrangement direction with respect to the first terminal fitting in a state where the third terminal connection portion is offset in the drawing direction with respect to the first terminal connection portion, and partitions between the first terminal fitting and the second terminal fitting, and a second partition wall which partitions between the first terminal fitting and the third terminal fitting, the second coupling portion is arranged to face the coating of the electric wire drawn out from the second electric wire connection portion on a side opposite to the first terminal fitting side, and the third coupling portion is arranged to face the coating of the electric wire drawn out from the third electric wire connection portion on a side opposite to the first terminal fitting side.

* * * * *